US011002035B1

(12) United States Patent
Wells et al.

(10) Patent No.: US 11,002,035 B1
(45) Date of Patent: May 11, 2021

(54) COVER ASSEMBLY WITH BIASING SEAMS FOR IMPROVED FOLDING

(71) Applicant: Classic Accessories, LLC, Kent, WA (US)

(72) Inventors: Delina M. Wells, Seattle, WA (US); Charles James D'Amato, Vashon, WA (US); Jose Derteano, Tacoma, WA (US); Gail E. Foster, Seattle, WA (US)

(73) Assignee: Classic Accessories, LLC, Kent, WA (US)

( * ) Notice: Subject to any disclaimer, the term of this patent is extended or adjusted under 35 U.S.C. 154(b) by 0 days.

(21) Appl. No.: 16/503,345

(22) Filed: Jul. 3, 2019

Related U.S. Application Data

(60) Provisional application No. 62/768,073, filed on Nov. 15, 2018.

(51) Int. Cl.
*E04H 15/32* (2006.01)
*E04H 4/10* (2006.01)
*A47J 37/07* (2006.01)
*A47C 31/10* (2006.01)

(52) U.S. Cl.
CPC ............ *E04H 15/32* (2013.01); *A47C 31/10* (2013.01); *A47J 37/0786* (2013.01); *E04H 4/10* (2013.01)

(58) Field of Classification Search
CPC ...... E04H 15/32; A47C 31/10; A47J 37/0786; D05B 35/06; D05B 1/20; D05B 93/00
USPC .......................................... 150/145; 135/115
See application file for complete search history.

(56) References Cited

U.S. PATENT DOCUMENTS

| 2,646,097 A | * | 7/1953 | Gaverth | B60J 11/02 |
| | | | | 150/166 |
| 2,950,749 A | | 8/1960 | MacDonald | |
| 4,637,330 A | * | 1/1987 | Shewmon | B63B 21/48 |
| | | | | 112/417 |
| 4,827,997 A | | 5/1989 | Rolan | |
| 4,948,191 A | | 8/1990 | Cao et al. | |
| 4,964,667 A | | 10/1990 | Reis et al. | |
| 5,029,933 A | | 7/1991 | Gillem et al. | |
| 5,409,286 A | | 4/1995 | Huang et al. | |
| 5,452,973 A | | 9/1995 | Arvin | |
| 5,476,127 A | | 12/1995 | Fournier | |
| 5,538,169 A | | 7/1996 | Moore et al. | |
| 5,620,040 A | | 4/1997 | Swanner et al. | |

(Continued)

FOREIGN PATENT DOCUMENTS

JP H08-169241 A 7/1996

*Primary Examiner* — Paola Agudelo
(74) *Attorney, Agent, or Firm* — Perkins Cole LLP

(57) ABSTRACT

A cover assembly for an indoor or outdoor item. The cover assembly is moveable between an expanded configuration and a collapsed configuration and includes panels of a textile material stitched together with inside seams and outside seams. The cover assembly receives the selected item within an interior area defined by the panels and the selected item holds the cover assembly in the expanded configuration. The outside seams are biased to close toward an interior area of the cover assembly and the inside seams are biased to close away from the interior area such that, when the cover assembly is removed from the selected item, the cover assembly is biased to close along the inside and outside seams to cause the cover assembly to move to the collapsed configuration to increase the ease of folding and storing the cover assembly.

9 Claims, 4 Drawing Sheets

(56) References Cited

U.S. PATENT DOCUMENTS

| | | | |
|---|---|---|---|
| 5,632,223 | A | 5/1997 | Bray et al. |
| 5,845,958 | A | 12/1998 | Rudys et al. |
| 6,003,929 | A | 12/1999 | Birdsell et al. |
| 7,093,878 | B1 | 8/2006 | Fontanilla et al. |
| 7,159,631 | B2 | 1/2007 | Yang et al. |
| 7,716,878 | B1 | 5/2010 | Altman et al. |
| 8,459,487 | B2 | 6/2013 | Sharma et al. |
| 9,155,397 | B2 | 10/2015 | D'Amato et al. |
| 9,883,747 | B2 | 2/2018 | D'Amato et al. |
| 10,384,572 | B2 * | 8/2019 | Sekino ............... D05B 1/22 |
| 2004/0173251 | A1 * | 9/2004 | Cantwell ............ E04H 15/54 |
| | | | 135/115 |
| 2009/0236019 | A1 * | 9/2009 | Maruzzo .......... A47J 37/0786 |
| | | | 150/154 |
| 2009/0288980 | A1 | 11/2009 | Hadala et al. |
| 2010/0025441 | A1 | 2/2010 | Blaney et al. |
| 2014/0326372 | A1 * | 11/2014 | Simon ............... A47J 36/06 |
| | | | 150/154 |
| 2016/0130796 | A1 * | 5/2016 | Chen ................. E04C 2/427 |
| | | | 428/12 |
| 2017/0167158 | A1 * | 6/2017 | Lynch ............... E04H 15/56 |
| 2017/0356200 | A1 * | 12/2017 | Campbell, Sr. ...... E04G 21/32 |
| 2018/0128438 | A1 * | 5/2018 | Sreshta ............. F21S 9/037 |

* cited by examiner

COVER ASSEMBLY WITH BIASING SEAMS FOR IMPROVED FOLDING

CROSS-REFERENCE TO RELATED APPLICATIONS

This non-provisional patent application claims the benefit of and priority to U.S. Provisional Patent Application No. 62/768,073, titled "COVER ASSEMBLY WITH BIASING SEAMS FOR IMPROVED FOLDING" and filed Nov. 15, 2018, which is incorporated herein in its entirety by reference thereto.

TECHNICAL FIELD

Embodiments of the present invention are directed to folding covers, including covers for outdoor furniture, appliances, vehicles, or other large items.

BACKGROUND

Grills, outdoor appliances, and outdoor furniture are very popular. Removable covers are often used to cover the items for protection against from rain, wind, water, dust, debris, or other adverse elements. Conventional covers for large outdoor items, however, are unwieldly to handle and are difficult to fold and store after removal. Many conventional covers are formed from large and stiff pieces of fabric or canvas that resist folding and bending, so folding the covers in a compact arrangement for storage can be difficult. Further, once the covers are folded, the folds can permanently crease the fabric material, which can decrease the visual appearance of the fabric and can even result in weak spots being formed that reduce the strength and durability of the cover. Accordingly, there is a need for an improved cover that maintains a positive aesthetic appearance while increasing the ease with which the cover can be handled and manipulated and be compactly stored when not covering a selected item.

DETAILED DESCRIPTION

Figure 1:
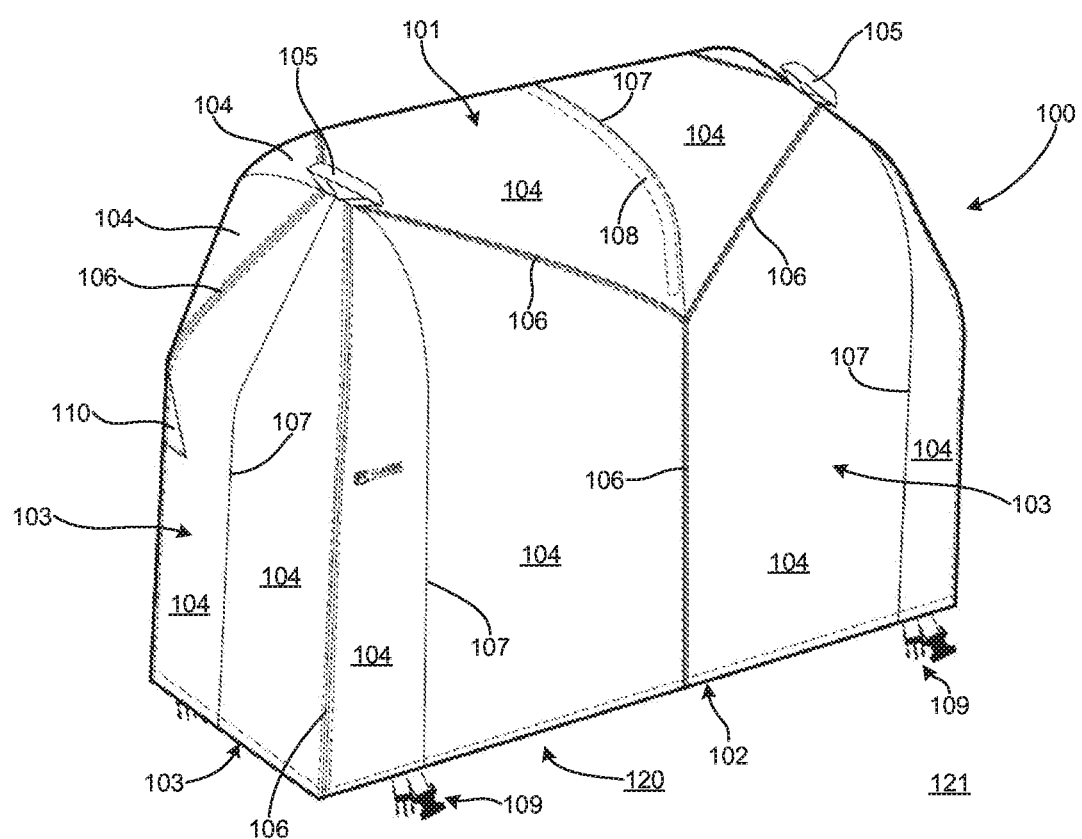
FIG. 1 is an isometric view of a cover assembly in accordance with at least one embodiment of the present technology.

A cover assembly 100 in accordance with one or more embodiments of the present disclosure is shown in the drawings for purposes of illustration. In at least one embodiment, the present technology provides a cover assembly configured to be removably positioned over an object. The cover assembly comprises a plurality of panels interconnected to each other and being moveable between an expanded configuration and a collapsed configuration. The plurality of panels in the expanded configuration define an interior area configured to receive the object. A first set of adjacent panels are joined together along respective first edge portions to form outside seams, and a second set of adjacent panels are joined together along respective second edge portions to form inside seams. The outside seams are biased to close toward the interior area, and the inside seams are biased to close away from the interior area. The cover assembly is configured to move from the expanded configuration to the collapsed configuration when the cover assembly is removed from the object and the outside and inside seams cause the panels to fold together. The cover assembly can include one or more handles attached to the plurality of panels and configured to allow the plurality of panels to be removed from the object, such that the inside and outside seams move the panels to automatically fold together toward a flattened configuration when the plurality of panel moved from the expanded configuration toward the collapsed configuration.

The cover assembly of an embodiment can have a plurality of panels interconnected to each other and being moveable between an expanded configuration and a collapsed configuration. A first panel can have a first outer surface and a first inner surface that opposes the first inner surface, and a second panel positioned adjacent to the first panel can have a second outer surface and a second inner surface that opposes the second outer surface. The first and second panels are joined together to form an outside seam. The outside seam is biased to cause the first and second inner surfaces to close toward each other. A third panel is positioned adjacent to the second panel such that the second panel is positioned between the first and third panels. The third panel has a third outer surface and a third inner surface that opposes the outer surface. The second and third panels are joined together to form an inside seam, and the inside seam is biased to cause the second and third outer surfaces to close toward each other.

One or more embodiments of a cover assembly in accordance with the present technology has an interior area and configured to at least partially cover an object received within the interior area. The cover assembly comprises a plurality of panels stitched together to at least partially define the interior area. The cover assembly includes a bottom edge defined by a portion of the plurality of panels, and adjacent panels are alternatingly stitched together with inside seams and outside seams. The inside seams are biased to close away from the interior area, and the outside seams are biased to close toward the interior area. When the cover assembly covers the object and the object is received within the interior area, the bottom edge has a first shape, and when the cover assembly is removed from the object, the inside and outside seams cause the panels to close in a predetermined way such that the bottom edge moves away from the first shape.

In the following description, numerous specific details are discussed to provide a thorough and enabling description for embodiments of the disclosure. One skilled in the relevant art, however, will recognize that the disclosure can be practiced without one or more of the specific details. In other instances, well-known structures or operations are not shown, or are not described in detail, to avoid obscuring aspects of the disclosure. In general, alternatives and alternate embodiments described herein are substantially similar to the previously described embodiments, and common elements are identified by the same reference numbers.

FIG. 1 is an isometric view of a cover assembly 100 configured to cover and protect a selected item, such as a grill, other appliance (indoor or outdoor), a piece of furniture, equipment, vehicle, hot tub, or other indoor or outdoor item. The cover assembly 100 has a top surface 101, a bottom edge 102, and side surfaces 103 that extend between the top surface 101 and the bottom edge 102. For purposes of discussion, an embodiment of the cover assembly 100 will be discussed in connection with covering a grill, although the cover could be used to cover one or more other selected outdoor or items. The cover assembly 100 is formed from a plurality of panels 104 of a textile material (e.g., canvas, polyester, etc.) stitched together to define an interior area 120 in which the grill is received. The textile material can be sufficiently flexible to allow the cover assembly 100 to at least partially deform and fit around the exterior shape of the grill, but is also stiff so the panels 104 will return to a generally planar arrangement after being bent or folded. The textile material is also durable enough so that the cover assembly 100 forms a barrier that protects the grill from environmental or other external conditions (e.g., rain, snow, sun, dirt, dust, etc.). Accordingly, in some embodiments, the textile material can be waterproof or water resistant. In other embodiments, the cover assembly 100 can be formed from a woven or non-woven material. For example, in some embodiments, the cover assembly 100 can be formed from leather, cloth, plastic, synthetic, or other suitable material. In some embodiments, the material can be a more flexible, lighter weight material while still adequately maintaining a construction that facilitates folding of the cover assembly, as discussed in greater detail below.

To allow an individual to easily grab and manipulate the cover assembly 100, the illustrated cover assembly 100 has handles 105 coupled to the top surface 101 (e.g., with stitching). The handles 105 are positioned and configured to allow an individual to easily grab and manipulate the cover assembly when positioning the cover assembly on or off the grill. Accordingly, an individual can remove the cover assembly 100 from the grill by pulling on the handles 105 to at least partially lift the cover assembly during the removal process. In the illustrated embodiments, the cover assembly includes two handles 105 stitched or otherwise coupled to the top surface 101. In other embodiments, the cover assembly 100 can include only one handle 105 or can include more than two handles 105, and the handles 105 can be coupled to any suitable portion of the cover assembly 100. In still other embodiments, the cover assembly 100 may include slots or protrusions that form integral handles 105.

In some embodiments, the cover assembly 100 can also include a strip 108 of weighted material or a retention material (or both) coupled to the top surface 101. The strip 108 is configured to help secure the cover assembly 100 to the grill (or other covered item) by weighing the top surface 101 down so that the cover assembly 100 remains coupled to the top of the grill. In embodiments for which the cover assembly 100 is configured to cover a grill or other item formed at least partially from ferrous metal, the strip 108 can be magnetic such that, when the cover assembly 100 is positioned over the grill, the strip 108 is magnetically coupled to the grill to help to keep the cover assembly 100 in the installed position over the grill. Further, when the individual removes the cover assembly 100 from the grill by pulling on the handles 105, the strip 108 can hold or pull the top surface 101 downwardly, which can help the panels 104 at or near the top surface 101 begin to fold together as the cover assembly is removed from the grill and moves from an expanded configuration in the installed position to a collapsed configuration in the removed, folded position. In the illustrated embodiment, the strip 108 has a width of approximately 1.5 inches and a length of approximately 22 inches.

In other embodiments, the strip 108 can be differently sized. In still other embodiments, the cover assembly 100 may not include a strip 108 of weighted material or a retention material.

One or more vents 110 can be formed in the cover assembly 100. The vents 110 can include one or more holes or openings formed in the panels 104 that fluidly connect the interior area 120 to the exterior area 121 to allow ventilation into and out of the interior area 120. A piece of the textile material can be stitched over the holes (e.g., with a bartack stitch) to partially cover the holes and prevent moisture, such as water or snow, or debris, such as grass or leaves, from entering the interior area 120 while still allowing airflow into or out of the interior area. In the illustrated embodiment, the cover assembly 100 includes a single vent 110 formed in one of the side surfaces 103. In other embodiments, the cover assembly 100 can include a plurality of vents 110 and the vents 110 can be formed in any suitable portion of the cover assembly 100. In still other embodiments, the cover assembly 100 may not include any vents 110.

The cover assembly 100 can also include one or more buckle assemblies 109 attached to the bottom edge 102 of the cover assembly for securing the cover assembly 100 to the grill. The one or more buckle assemblies 109 can include male and female buckle portions coupled to webs configure to loop around portions of the grill (e.g., a leg, a wheel, etc.) so that the male and female buckle portions can attach to each other. The webs can be approximately 1 inch wide and 12 inches long and can be coupled to the panels 104 with a bartack stitch. In some embodiments, the cover assembly 100 includes four buckle assemblies 109 positioned around the lower bottom edge 102. In other embodiments, the cover assembly 100 can include just a single buckle assembly 109, two buckle assemblies 109, three buckle assemblies 109, or more than four buckle assemblies 109. Additional details about an embodiment of a strap and buckle arrangement that can be used are described in U.S. Pat. No. 9,155,397, titled Furniture Cover Assembly, filed May 6, 2013, and which is incorporated herein in its entirety by reference thereto. In some embodiments, other types of tie-down mechanisms can be used in conjunction with the buckle assemblies 109 or can be used instead of the buckle assemblies 109. In still other embodiments, the cover assembly 100 may not include any type of tie-down mechanisms.

In the illustrated embodiment, pairs of adjacent panels 104 of the textile material are joined together using selected stitching patterns and techniques that affect how the cover assembly 100 starts to fold when the cover assembly 100 is removed from the grill. For example, in representative embodiments, some of the pairs of adjacent panels 104 are stitched together to form outside seams 106, while other pairs of adjacent panels 104 are stitched together to form inside seams 107. As discussed in greater detail below, the outside seams 106 are biased to close towards the interior area 120, such that that the outside seams 106 projects away from the interior area 120, while the inside seams 107 are biased to close away from the interior area 120, such that the inside seams 107 project toward the interior area 120. With this arrangement, the cover assembly 100 can start to fold along the seams 106 and 107 and collapse in a pre-selected manner when the cover assembly 100 is lifted and removed from the grill.

Figure 2A:
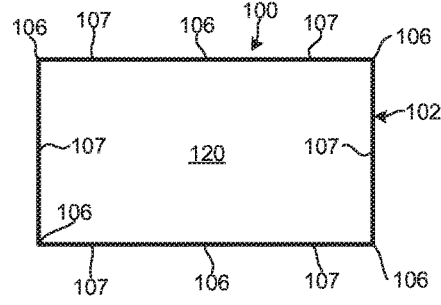
FIGS. 2A-C show bottom plan views of the assembly of FIG. 1 being folded.
Figure 2B:
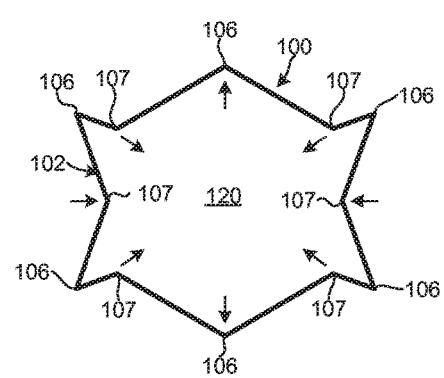
Figure 2C:
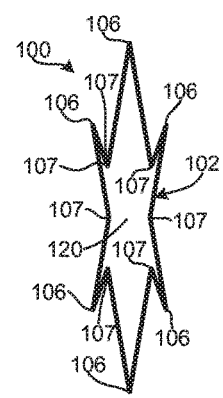
Figure 3A:
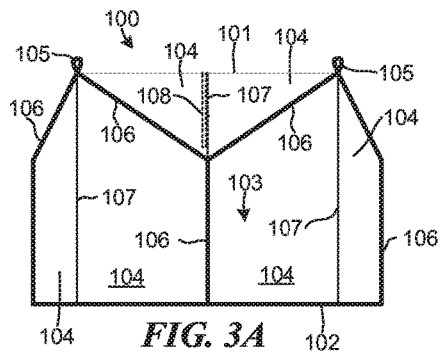
FIGS. 3A-C show side elevation views of the assembly of FIG. 1 being folded.
Figure 3B:
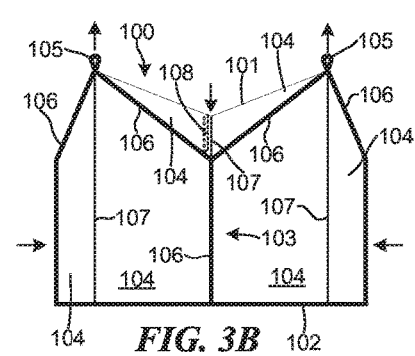
Figure 3C:
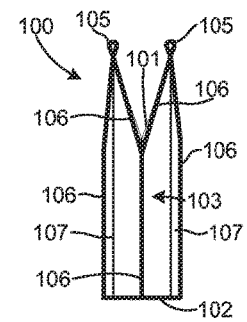

FIGS. 2A-C show bottom plan views of the cover assembly 100 depicted in FIG. 1 as the cover assembly 100 is removed from the grill and is biased to fold as directed by the outside and inside seams 106 and 107. FIGS. 3A-C show side elevation views of the cover assembly 100 that correspond to the views shown in FIGS. 2A-C. Specifically, FIGS. 2A and 3A show the shape of the cover assembly 100 when the cover assembly 100 is in an expanded configuration, such as when the cover assembly 100 is installed over the grill and the grill is positioned within the interior area 120. FIGS. 2B and 3B show the shape of the cover assembly 100 in an intermediate position between the expanded configuration and a collapsed configuration as the cover assembly 100 moved toward the removed position, wherein the cover assembly 100 is moved away from the installed position and starts to fold along the outside and inside seams 106 and 107. FIGS. 2C and 3C show the shape of the cover assembly 100 in the collapsed configuration, such as when the cover assembly 100 is removed from the grill and the seams 106 and 107 cause the panels 104 to fold together.

When the cover assembly 100 is in the installed position over grill, the cover assembly 100 can have a shape that generally corresponds to the shape of the grill. In the illustrated embodiment, the bottom edge 102 of the cover assembly 100 defines a generally rectangular shape, while the side surface 103 has a tapered shape such that the width of the side surface 103 near the bottom edge 102 is larger than the width of the side surface 103 near the top surface 101. In other embodiments, the cover assembly 100 can be configured to be positioned over a differently shaped item and, accordingly, the cover assembly 100 can be differently shaped.

The cover assembly 100 is configured so a user can lift the cover assembly off the grill by grasping and lifting generally upwardly on the handles 105, thereby lifting and causing the top surface 101 to move upwardly. As the cover assembly 100 begins to move away from the installed position, and the user also moves the handles toward each other, the cover assembly 100 naturally starts to fold about the outside and the inside seams 106 and 107. The outside seams 106 cause the associated panels 104 to fold inwardly toward the interior area 120 while the inside seams 107 simultaneously cause the associated panels 104 to fold outwardly away from the interior area 120. With this arrangement, the panels 104 are biased to fold together to cause the cover assembly 100 to and move toward the collapsed configuration. As best shown in FIG. 2B, each of the outside seams 106 is biased to close toward the interior area 120 such that the seams 106 move away from the interior area 120 while forcing the inner surfaces of the corresponding panels 104 toward each other. Conversely, each of the inside seams 107 is biased to close away from the interior area 120 such that seams 107 move toward the interior area 120 while forcing outer surfaces of the corresponding panels 104 toward each other. Further, the strip 108 helps to temporarily retain the center of the top surface 101 in a downward position adjacent to the top of the grill, toward the interior area 120, as the user is lifting on the handles, which also helps move the panels 104 that form the inside seam 107 on the top surface 101 toward each other.

As the cover assembly 100 continues to move from the expanded configuration toward the collapsed configuration and the panels 104 continue to fold together about the outside and inside seams 106 and 107, the side surfaces 103 move toward each other and the size of the interior area 120 decreases. As best shown in FIGS. 2C and 3C, the panels 104 will continue to fold about the seams 106 and 107, while the panels 104 generally remain flat and/or substantially planar until at least some of the seams 106 and 107 are unable to continue to fold, at which point, the interior area 120 is substantially smaller than it was previously and the cover assembly 100 can be easily manipulated and handled by an individual. As a result, this folding action facilitated by the inside and outside seams 106 and 107 enables the cover assembly 100 to be stored faster, more consistently, and more compactly. Further, the cover assembly 100 is configured to collapse by folding along the outside and inside seams 106 and 107, therefore minimizing the formation of creases in the panels 104 away from the seams. As a result, the seams 106 and 107 can increase the aesthetic appearance of the panels 104 and reduces the likelihood of weak spots, excessive wear, and discoloration forming in the panels 100.

Figure 4A:
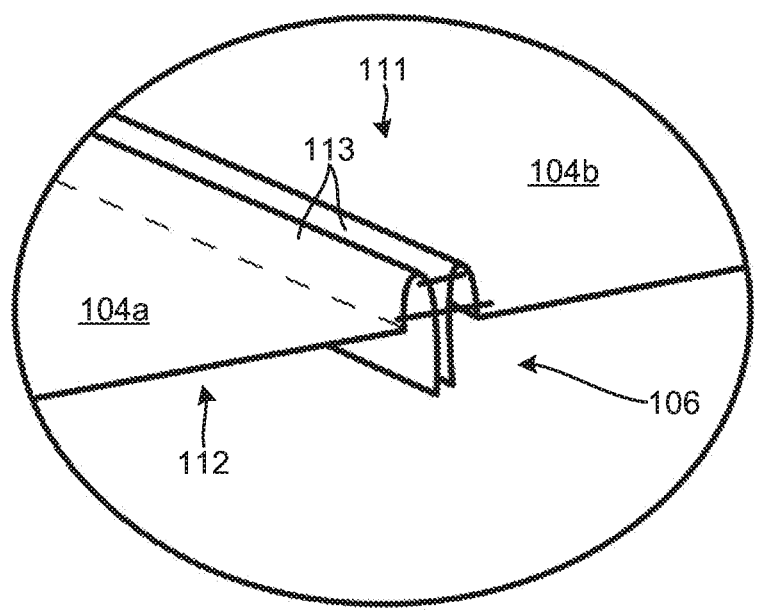
FIGS. 4A and 4B show views of an outside fold that joins two panels of a textile material together in accordance with embodiments of the present technology.
Figure 4B:
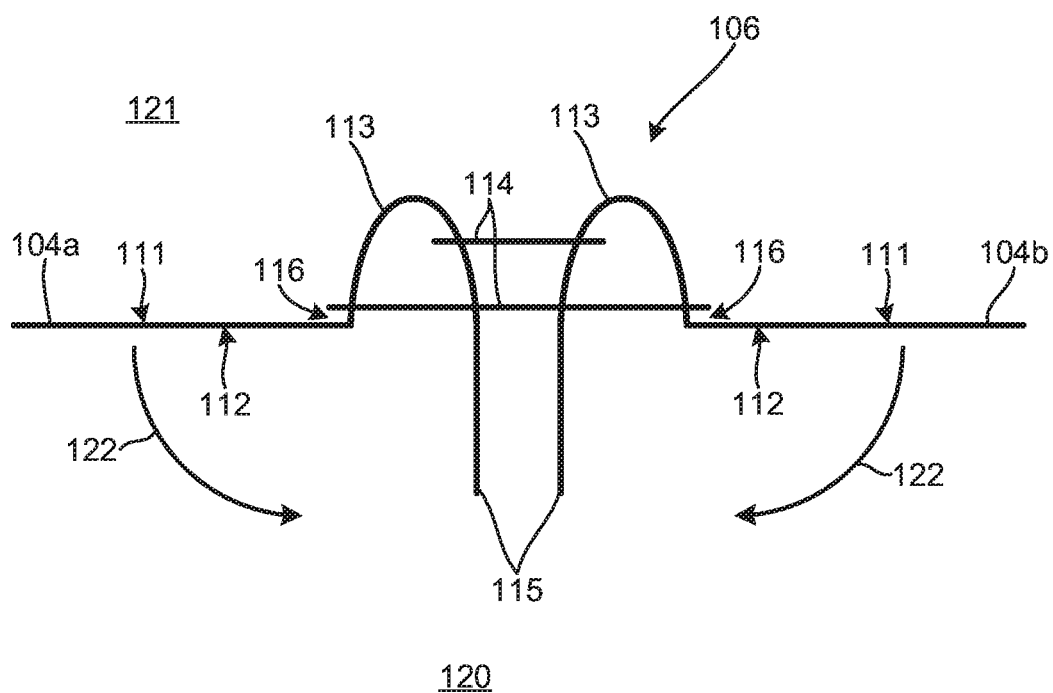

To form the outside seams 106 and the inside seams 107, two panels 104 are positioned adjacent to each other and joined together using specific selected stitching patterns for the respective outside or inside seam 106 or 107. FIGS. 4A and 4B show views of panels 104a and 104b joined together to form one of the outside seams 106. Both panels 104a and 104b include outer surfaces 111, inner surfaces 112, and edge portions 115, which extend around the outer perimeter of the panel 104. The panels 104a and 104b are positioned adjacent to each other such that their respective outer and inner surfaces 111 and 112 are generally coplanar with each other. In representative embodiments, ridges 113 are formed by folding or bending the panels 104a and 104b along the edge portions 115. The two ridges 113 are aligned with each other and affixed together with stitching 114. With this arrangement, the ridges 113 project toward the exterior area 121 and away from the interior area 120, while ends of the edge portions 115 project in the opposite directions. Further, when the outer surfaces 111 of the panels 104a and 104b are generally coplanar, the edge portions 115 can extend perpendicular to the inner surfaces 112 while the ridges 113 extend generally perpendicular to the outer surfaces 111. Creases 116 are formed between the ridges 113 and the outer surfaces 111 and, in some embodiments, the creases 116 can form an angle of approximately 90°. In some embodiments, the tops of the ridges 113 can be spaced apart from the outer surfaces 111 by approximately 0.25 inches and the edge portions 115 can be spaced apart from the top of the ridges 113 by about 0.5 inches. In other embodiments the features of the construction can have other dimensions. Forming ridges 113 in the adjacent panels 104a and 104b and using stitching 114 to couple the two ridges 113 together is only one possible seam construction technique. In other embodiments, the outside seams 106 can be formed using one or more other suitable seam construction technique. For example, the outside seams 106 can be formed using piping, binding, or any other suitable seam construction technique.

As previously described, the outside seams 106 are biased to close toward the interior area 120 such that the inner surfaces 120 of the panels 104a and 104b move toward each other. Because of the stiffness of the textile material that forms the panels 104, when the cover assembly 100 is removed from the grill or other covered item, the edge portions 115 of the panels 104a and 104b are biased to naturally straighten by pivoting about the creases 116, as shown by arrows 122 (i.e., so the joined panels 104 are substantially parallel or otherwise not coplanar). The edge portions of the joined panels 104a and 104b continue to straighten until the angles formed by the creases 116 are each larger than 90°. In some embodiments, the panels 104a and 104b straighten until the creases 116 are generally flat and form an angle of approximately 180°. At this point, the inner surfaces 112 of the panels 104a and 104b face each other while the outer surfaces 111 face away from each other. In other embodiments, the panels 104a and 104b straighten until the creases 116 form an angle of approximately 150°, 135°, between 150° and 180°, or any other suitable angle between 90° and 180°.

Figure 5A:
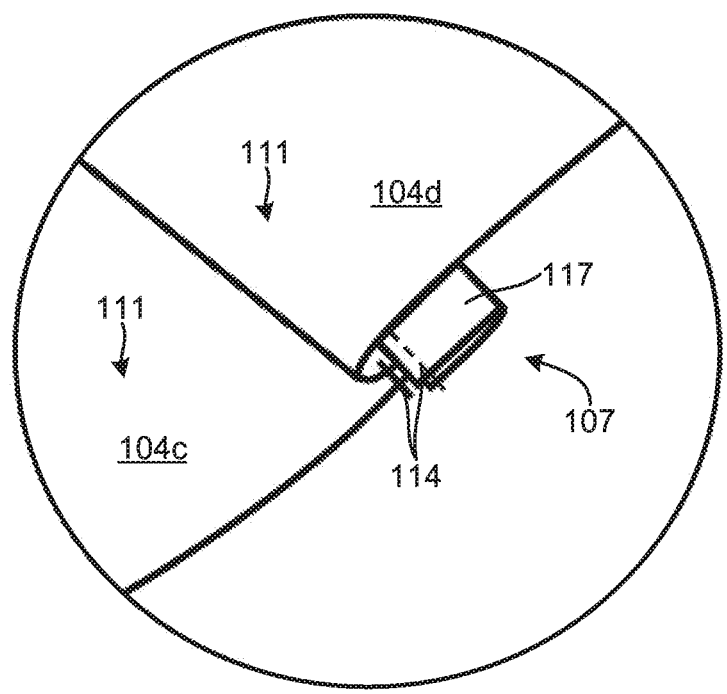
FIGS. 5A and 5B show view of an inside fold that joins two panels of the textile material together in accordance with embodiments of the present technology.
Figure 5B:
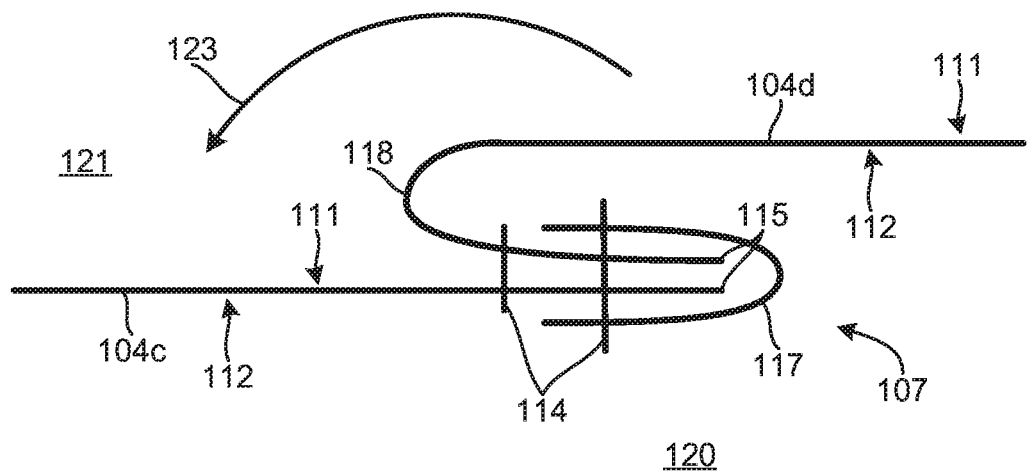

FIGS. 5A and 5B show views of two adjacent panels 104c and 104d joined together to form one of the inside seams 107. The panels 104c and 104d are aligned such that the edge portion 115 of the panel 104d is positioned over the edge portion 115 of the panel 104c such that the outer surfaces 111 of the panels 104c and 104d face each other. A piece of binding material 117 is positioned around the two edge portions 115 and stitching 114 is used to secure the panels 104c and 104d and the piece of binding material 117 to each other. With this arrangement, the end portions 115 and the piece of binding material 117 extend into the interior area 120. The binding material 117 can be formed from a generally stiff material, such as PVC, other plastic, a coated textile, or other shifting material, and can provide stiffness to the inside seam 107. Overlapping the edge portions 115 of the panels 104c and 104d, positioning a piece of binding material 117 around the edge portions 115, and using stitching 114 to couple the panels 104c and 104d and the piece of binding material 117 together is only one possible seam construction technique. In other embodiments, one or more of the inside seams 107 can be formed using other suitable seam construction techniques.

When the cover assembly 100 is positioned over the grill, the inside seams 107 can be in a generally flat configuration in which the outer surfaces 111 of the panels 104c and 104d face the exterior area 121 while the inner surfaces 112 face the interior area 120. In this configuration, the panel 104d is folded back on itself to form a generally U-shaped fold 118. However, the stiffness of the piece of binding material 117 can prevent or restrict the panel 104d from continuing to fold back on itself. Further, as previously described, the textile material that forms the panels 104c and 104d is generally stiff and is biased to return to a generally planar arrangement. Accordingly, the panel 104d is biased to straighten out by pivoting about the fold 118 to straighten the fold 118. As a result, when the cover assembly 100 is removed from the grill, the panel 104d naturally straightens by pivoting toward the panel 104c, as shown by arrow 123, until the panel 104d is positioned over the panel 104c. In some embodiments, the panel 104d straightens until the fold 118 is completely flattened and the panel 104d is generally parallel to the panel 104c. At this point, the outer surfaces 111 of the panels 104c and 104d face each other while the inner surfaces 112 face in opposing direction. In other embodiments, the panel 104d may not completely straighten out but may straighten until the outer surface 111 of the panel 104d forms an angle between 0° and 90° with the outer surface 111 of the panel 104c.

In the illustrated embodiments, the cover assembly 100 includes outside seams 106 and the inside seams 107 alternatingly formed around the perimeter. With this arrangement, each seam 106 and 107 opens in the opposite direction to an adjacent seam. In other embodiments, however, at least one of the outside seams 106 can be formed adjacent to a different outside seam 106 and/or at least one of the inside seams 107 can be formed adjacent to a different inside seam 107. In still other embodiments, the cover assembly 100 can also include other seams not biased to open in a specific direction. In general, the cover assembly 100 can be formed to include any suitable number and type of seams and can be arranged in any suitable order. The arrangement of the outside and inside seams 106 and 107 work with the adjacent panels 104 to start to fold as the cover assembly 100 is removed from the grill or other item, so as to easily provide a folded and flattened cover assembly in the removed position for compact storage.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A cover assembly configured to be removably positioned over an object, the cover assembly comprising:
    a plurality of panels interconnected to each other and being moveable between an expanded configuration and a collapsed configuration, the plurality of panels in the expanded configuration defining an interior area configured to receive the object;
    wherein a first set of adjacent panels are joined together along respective first edge portions to form outside seams, and a second set of adjacent panels are joined together along respective second edge portions to form inside seams;
    the outside seams are stitched to be biased to close toward the interior area;
    the inside seams are stitched to be biased to close away from the interior area; and
    the cover assembly is configured to move from the expanded configuration to the collapsed configuration when the cover assembly is removed from the object and the outside and inside seams cause the panels to fold together;
    wherein:
    the first set of adjacent panels comprises first and second panels positioned directly adjacent each other;
    the first and second panels are joined together along the respective first edge portions to form an outside seam;
    the first edge portion of the first panel having a first ridge and the first edge portion of the second panel having a second ridge; and
    the first and second ridges are aligned with each other and the first and second ridges are secured together to form the outside seam;
    and the first and second ridges extend away from the interior area and the first and second edge portions extend toward the interior area.

2. The cover assembly of claim 1 wherein
    the first and second panels comprise first and second inner surfaces that face toward the interior area; and
    when the cover assembly moves from the expanded configuration to the collapsed configuration, the outer seam causes the first and second inner surfaces to move toward each other.

3. The cover assembly of claim 2 wherein
    the first and second panels comprise first and second upper surfaces that face away from the interior area;
    when the cover assembly is in the expanded configuration, the outer seam includes a first crease formed between the first upper surface and the first ridge and a second crease formed between the second upper surface and the second ridge;
    the first and second panels are formed from a textile material having a stiffness, and
    the outer seam causes the first and second inner surfaces to move toward each other due to the stiffness of the textile material causing the first and second creases to straighten.

4. The cover assembly of claim 1, further comprising a pair of handles attached to the plurality of panels and configured to allow the plurality of panels to be removed from the object and wherein the inside and outside seams are stitched to move the panels to automatically fold together toward a flattened configuration when the plurality of panels moved from the expanded configuration toward the collapsed configuration.

5. The cover assembly of claim 1 wherein individual of the panels are formed from a stiff textile material;

when the cover assembly is in the expanded configuration, at least a portion of the textile material is bent; and the stiffness of the textile material at least partially causes outer and inner seams to be biased by causing the bent portions of the textile material to straighten.

6. A cover assembly configured to be removably positioned over an object the cover assembly comprising:

a plurality of panels interconnected to each other and being moveable between an expanded configuration and a collapsed configuration, the plurality of panels in the expanded configuration defining an interior area configured to receive the object;

wherein a first set of adjacent panels are joined together along respective first edge portions to form outside seams, and a second set of adjacent panels are joined together along respective second edge portions to form inside seams;

the outside seams are biased to close toward the interior area;

the inside seams are biased to close away from the interior area; and the cover assembly is configured to move from the expanded configuration to the collapsed configuration when the cover assembly is removed from the object and the outside and inside seams cause the panels to fold together;

wherein the second set of adjacent panels comprises a first panel and a second panel positioned directly adjacent to the first panel;

the first and second panels are joined together along the respective second edge portions to form an inside seam; and wherein the adjoined edges are positioned within the interior area;

the first panel comprises a first outer surface and the second panel comprises a second outer surface; and the first and second outer surfaces face away from the interior area.

7. The cover assembly of claim 6, further comprising binding material positioned at least partially around adjoined edges of the second set of adjacent panels, wherein the stitching joins the binding material to the adjoined edges to form the inside seam.

8. The cover assembly of claim 6 wherein when the cover assembly is in the expanded configuration, the second panel is folded back on itself to form a U-shaped fold; and when the cover assembly moves from the expanded configuration to the collapsed configuration, the inside seam causes the first and second outer surfaces to move toward each other by causing the U-shaped fold to straighten.

9. The cover assembly of claim 8 wherein the first and second panels are formed from a textile material having a stiffness; and when the cover assembly moves from the expanded configuration to the collapsed configuration, the stiffness of the textile material at least partially causes the U-shaped fold to straighten.

* * * * *